US008433609B2

(12) United States Patent
Abhyanker

(10) Patent No.: US 8,433,609 B2
(45) Date of Patent: Apr. 30, 2013

(54) GEOSPATIALLY CONSTRAINED GASTRONOMIC BIDDING

(75) Inventor: Raj V Abhyanker, Cupertino, CA (US)

(73) Assignee: Raj Vasant Abhyanker, Cupertino, CA (US)

( * ) Notice: Subject to any disclaimer, the term of this patent is extended or adjusted under 35 U.S.C. 154(b) by 0 days.

(21) Appl. No.: 13/310,819

(22) Filed: Dec. 5, 2011

(65) Prior Publication Data

US 2013/0080217 A1 Mar. 28, 2013

Related U.S. Application Data

(63) Continuation of application No. 13/242,303, filed on Sep. 23, 2011.

(51) Int. Cl.
*G06Q 30/00* (2012.01)
*G06Q 40/00* (2012.01)

(52) U.S. Cl.
USPC .................... 705/14.1; 705/14.58; 705/14.27; 705/14.57; 705/14.23; 705/37

(58) Field of Classification Search ........................ None
See application file for complete search history.

(56) References Cited

U.S. PATENT DOCUMENTS 5,794,207 A * 8/1998 Walker et al. .................. 705/77
5,835,896 A * 11/1998 Fisher et al. .................... 705/37
6,199,050 B1 3/2001 Alaia et al.
6,415,270 B1 7/2002 Rackson et al.
6,741,969 B1 * 5/2004 Chen et al. ................. 705/14.27
6,865,261 B1 3/2005 Rao et al.
6,892,186 B1 5/2005 Preist
6,907,405 B2 * 6/2005 Brett .............................. 705/37
6,976,005 B1 12/2005 Bansal et al.
7,184,990 B2 * 2/2007 Walker et al. ................. 705/400
7,188,080 B1 * 3/2007 Walker et al. ................... 705/16
7,216,103 B2 5/2007 Friedland et al.
7,461,022 B1 12/2008 Churchill et al.
7,505,929 B2 * 3/2009 Angert et al. ................ 705/26.3
7,580,870 B1 8/2009 Chang
7,617,145 B1 11/2009 Peterson
7,840,472 B1 11/2010 Levy et al.

(Continued)

FOREIGN PATENT DOCUMENTS

EP 1041502 A2 10/2000
EP 1220126 A2 7/2002

(Continued)

*Primary Examiner* — John Weiss
*Assistant Examiner* — Eric Netzloff
(74) *Attorney, Agent, or Firm* — Raj Abhyanker, P.C.

(57) ABSTRACT

A method includes determining, through one or more central server(s), that a bidding platform provided by a gastronomic bidding service provider has a number of requests for gastronomical offers within a residential location zip code and/or a daytime location zip code associated with a user thereof. The method also includes permitting the user to access the number of requests for gastronomical offers within the residential location zip code and/or the daytime location zip code, and denying the user access to a request within a zip code outside a geospatially constrained region around the residential location zip code and/or the daytime location zip code thereof. Further, the method includes permitting the user to create a series of standing bid amounts spread across a spectrum of time and crediting an account associated with the gastronomic bidding service provider on the one or more central server(s) with an appropriate amount.

6 Claims, 14 Drawing Sheets

U.S. PATENT DOCUMENTS

| | | | | |
|---|---|---|---|---|
| 7,946,489 | B2 | 5/2011 | Gelbman | |
| 7,974,879 | B2 | 7/2011 | Chu et al. | |
| 7,996,277 | B2 | 8/2011 | Glasspool | |
| 8,027,879 | B2 | 9/2011 | Ramer et al. | |
| 8,032,413 | B2 | 10/2011 | Carlson | |
| 2001/0029479 | A1 | 10/2001 | Watanabe | |
| 2001/0032175 | A1 | 10/2001 | Holden et al. | |
| 2002/0029182 | A1 | 3/2002 | Nakagawa | |
| 2002/0046131 | A1* | 4/2002 | Boone et al. | 705/26 |
| 2002/0077956 | A1 | 6/2002 | Solheim | |
| 2002/0077959 | A1 | 6/2002 | Alaia et al. | |
| 2002/0120552 | A1 | 8/2002 | Grey et al. | |
| 2003/0036975 | A1 | 2/2003 | Martin et al. | |
| 2003/0041010 | A1 | 2/2003 | Yonao | |
| 2003/0041014 | A1 | 2/2003 | Grey et al. | |
| 2003/0158806 | A1 | 8/2003 | Hanley et al. | |
| 2003/0195839 | A1 | 10/2003 | Dinwoodie | |
| 2003/0216959 | A1 | 11/2003 | Vitti | |
| 2004/0107125 | A1 | 6/2004 | Guheen et al. | |
| 2004/0243478 | A1* | 12/2004 | Walker et al. | 705/26 |
| 2004/0267624 | A1 | 12/2004 | Nuriel | |
| 2005/0021444 | A1 | 1/2005 | Bauer et al. | |
| 2005/0278241 | A1 | 12/2005 | Reader | |
| 2005/0289043 | A1 | 12/2005 | Maudlin | |
| 2006/0010037 | A1 | 1/2006 | Angert et al. | |
| 2006/0100896 | A1 | 5/2006 | Lahey et al. | |
| 2006/0155637 | A1 | 7/2006 | Hawkes et al. | |
| 2006/0200401 | A1 | 9/2006 | Lisani et al. | |
| 2006/0206408 | A1 | 9/2006 | Nassiri | |
| 2006/0218070 | A1 | 9/2006 | Lange | |
| 2007/0054739 | A1 | 3/2007 | Amaitis et al. | |
| 2007/0073585 | A1 | 3/2007 | Apple et al. | |
| 2007/0124229 | A1 | 5/2007 | Ku et al. | |
| 2007/0150375 | A1 | 6/2007 | Yang | |
| 2007/0203823 | A1 | 8/2007 | Whelchel et al. | |
| 2007/0208616 | A1 | 9/2007 | Choi | |
| 2007/0214075 | A1 | 9/2007 | Ablan | |
| 2008/0010162 | A1 | 1/2008 | Gottehrer | |
| 2008/0016007 | A1 | 1/2008 | Erisman | |
| 2008/0065523 | A1 | 3/2008 | Schneider | |
| 2008/0065527 | A1 | 3/2008 | Chieu et al. | |
| 2008/0071672 | A1 | 3/2008 | Rupp et al. | |
| 2008/0133394 | A1 | 6/2008 | Franks | |
| 2008/0167983 | A1 | 7/2008 | Kadir et al. | |
| 2008/0189200 | A1 | 8/2008 | Bonfardin | |
| 2008/0306862 | A1 | 12/2008 | Montgomery | |
| 2008/0319855 | A1 | 12/2008 | Stivoric et al. | |
| 2009/0164361 | A1 | 6/2009 | Lange | |
| 2009/0198591 | A1 | 8/2009 | Loeb et al. | |
| 2009/0254472 | A1 | 10/2009 | Conboy et al. | |
| 2009/0292599 | A1 | 11/2009 | Rampell et al. | |
| 2009/0292647 | A1 | 11/2009 | Porat et al. | |
| 2010/0030578 | A1 | 2/2010 | Siddique et al. | |
| 2010/0088193 | A1 | 4/2010 | White | |
| 2010/0217687 | A1 | 8/2010 | Garafola | |
| 2010/0241507 | A1 | 9/2010 | Quinn et al. | |
| 2010/0274606 | A1 | 10/2010 | Fain et al. | |
| 2010/0274669 | A1 | 10/2010 | Carlson | |
| 2010/0318416 | A1 | 12/2010 | Seymour et al. | |
| 2010/0332306 | A1 | 12/2010 | Darveau et al. | |
| 2011/0004513 | A1 | 1/2011 | Hoffberg | |
| 2011/0059784 | A1 | 3/2011 | Lutnick et al. | |
| 2011/0066518 | A1 | 3/2011 | Mack et al. | |
| 2011/0125604 | A1 | 5/2011 | House | |
| 2011/0125628 | A1 | 5/2011 | Marchegiani | |
| 2011/0153446 | A1 | 6/2011 | Werner et al. | |
| 2011/0161130 | A1 | 6/2011 | Whalin et al. | |
| 2011/0173062 | A1 | 7/2011 | Chen et al. | |
| 2011/0173075 | A1 | 7/2011 | Carlson et al. | |
| 2011/0231182 | A1 | 9/2011 | Weider et al. | |
| 2012/0239483 | A1* | 9/2012 | Yankovich et al. | 705/14.35 |

FOREIGN PATENT DOCUMENTS

| | | | |
|---|---|---|---|
| WO | 2010104834 | A2 | 9/2010 |
| WO | 2011062623 | A2 | 5/2011 |
| WO | 2011119859 | A2 | 9/2011 |

* cited by examiner

GASTRONOMICAL ITEM 302 - EGGPLANT PARMESAN SANDWICH

RETAIL ESTABLISHMENT 304 - ABC SANDWICHES

RETAIL PRICE 350 - $8.95

MINIMUM RESERVE PRICE 310 (50% DISCOUNT) - $4.48

MAXIMUM PRICE CONSTRAINT 308 - $7.16 (80% OF $8.95)

(SET BY SERVICE PROVIDER 306)

ACCEPT FACTOR 316 - 5%

PAYOUT FACTOR 314 - 1%

| QUANTITY 390 | ACCEPT PRICE 320($) | PAYOUT PRICE 312($) | PROFIT ($) | BUY-IT-NOW-PRICE 340($) |
|---|---|---|---|---|
| 0 | 0 | 0 | 0 | N.A |
| 1 | 4.61 | 4.48 | 0.13 | 6.53 |
| 2 | 4.74 | 4.50 | 0.24 | 6.53 |
| 3 | 4.86 | 4.53 | 0.33 | 6.53 |
| ⋮ | ⋮ | ⋮ | ⋮ | ⋮ |
| 29 | 6.55 | 5.13 | 1.42 | N.A |
| ⋮ | ⋮ | ⋮ | ⋮ | ⋮ |
| 123 | 7.16 | 6.37 | 0.78 | N.A |
| ⋮ | ⋮ | ⋮ | ⋮ | ⋮ |
| 361 | 7.16 | 7.09 | 0.07 | N.A |
| ⋮ | ⋮ | ⋮ | ⋮ | ⋮ |
| 366 | 7.16 | 7.09 | 0.07 | N.A |

FIGURE 3

GEOSPATIALLY CONSTRAINED GASTRONOMIC BIDDING

CLAIM OF PRIORITY

This is an Accelerated Examination application, a continuation of, and claims priority to: Utility application Ser. No. 13/242,303 filed on Sep. 23, 2011 titled "GEOSPATIALLY CONSTRAINED GASTRONOMIC BIDDING"

FIELD OF TECHNOLOGY

This disclosure relates generally to gastronomic bidding and, more particularly, to methods, an apparatus and/or a system of geospatially constrained gastronomic bidding.

BACKGROUND

A retail establishment serving gastronomical items (e.g., a restaurant, a market, a convenience store, a catering service provider) may depend on customers who spend a significant portion of time thereof around a physical address of the retail establishment (e.g., in the same zip code, in the same street, in the same town). The retail establishment may wish to identify such customers because the aforementioned may prospectively patronize the retail establishment regularly and frequently because of convenience therein.

The retail establishment may distribute material (e.g., flyers, menus, coupons, collateral) in the neighborhood thereof (e.g., through direct mail, Valpak®, etc.). However, these materials may not reach prospective customers who spend daytime hours around the retail establishment but do not live around the retail establishment (e.g., those who work around the retail establishment, those who go to school around the retail establishment etc.). Additionally, the retail establishment may be banned from distributing material on cars, in parking lots, and/or on sidewalks by local ordinances and/or private rules. As such, it may be difficult for the retail establishment to attract customers who spend daytime hours around the retail establishment (e.g., customers who work around the retail establishment, customers who go to school around the retail establishment).

As an additional measure, the retail establishment may agree to be featured on a daily deals website (e.g., Groupon®, Plum District®). The retail establishment may gain single visit customers who drive large distances (e.g., many kilometers) to the retail establishment when featured on the daily deals website. It may be difficult for such customers to come often and/or regularly to the retail establishment because of the time inconvenience involved in traveling to the retail establishment. Furthermore, the retail establishment may not financially benefit by such single visit customers (e.g., because there may be no profit margin in a special offered on the deals website, and because of the statistical improbability of repeat visits). In addition, the retail establishment may be faced with a large influx of customers that cannot be satisfactorily serviced based on current trained labor, capacity and/or food sourcing constraints soon after (e.g., for days and/or for weeks) being featured on the daily deals website.

Similarly, potential customers may find the daily deals website frustrating because many of the retail establishments featured on the daily deals website may be geographically distant from a primary location (e.g., home) and a secondary location (e.g., work location, school location, etc.) thereof. As a result, the retail establishment may struggle to identify marketing avenues to predictably attract customers around the secondary location who spend daytime hours around the retail establishment. In addition, the retail establishment may struggle to distribute demand better such that trained labor, capacity and/or food sourcing constraints can be scaled to adequately meet such demand Current technologies do not provide solutions to these constraints.

SUMMARY

Disclosed are methods, an apparatus and/or a system of geospatially constrained gastronomic bidding.

In one aspect, a method includes determining, through one or more central server(s) associated with a gastronomic bidding service provider, that a bidding platform provided by the gastronomic bidding service provider has a number of requests for gastronomical offers within a residential location zip code and/or a daytime location zip code associated with a user thereof. The one or more central server(s) includes a processor communicatively coupled to a memory. The method also includes permitting the user to access the number of requests for gastronomical offers within the residential location zip code and/or the daytime location zip code thereof, and denying the user access to a request for a gastronomical offer within a zip code outside a geospatially constrained region around the residential location zip code and/or the daytime location zip code thereof.

Further, the method includes permitting the user to create a series of standing bid amounts spread across a spectrum of time such that the standing bid amounts are submitted periodically to a set of retail establishments based on a gastronomical item, a business name, a cuisine type, the residential location zip code and/or the daytime location zip code. The standing bid amounts are associated with one or more requests for gastronomical offers. Still further, the method includes crediting an account associated with the gastronomic bidding service provider on the one or more central server(s) with an amount between a bid price of the gastronomical item and a particular payout price thereof when the bid price is at least a particular accept price corresponding to the particular payout price.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 3 is an example business model of income from bidding on a gastronomical item through the GCGBS of FIG. 1.

Other features of the present embodiments will be apparent from the accompanying drawings and from the detailed description that follows.

DETAILED DESCRIPTION

Example embodiments, as described below, may be used to provide a method, a system and/or an apparatus of geospatially constrained gastronomic bidding. Although the present embodiments have been described with reference to specific example embodiments, it will be evident that various modifications and changes may be made to these embodiments without departing from the broader spirit and scope of the various embodiments.

Figure 1:
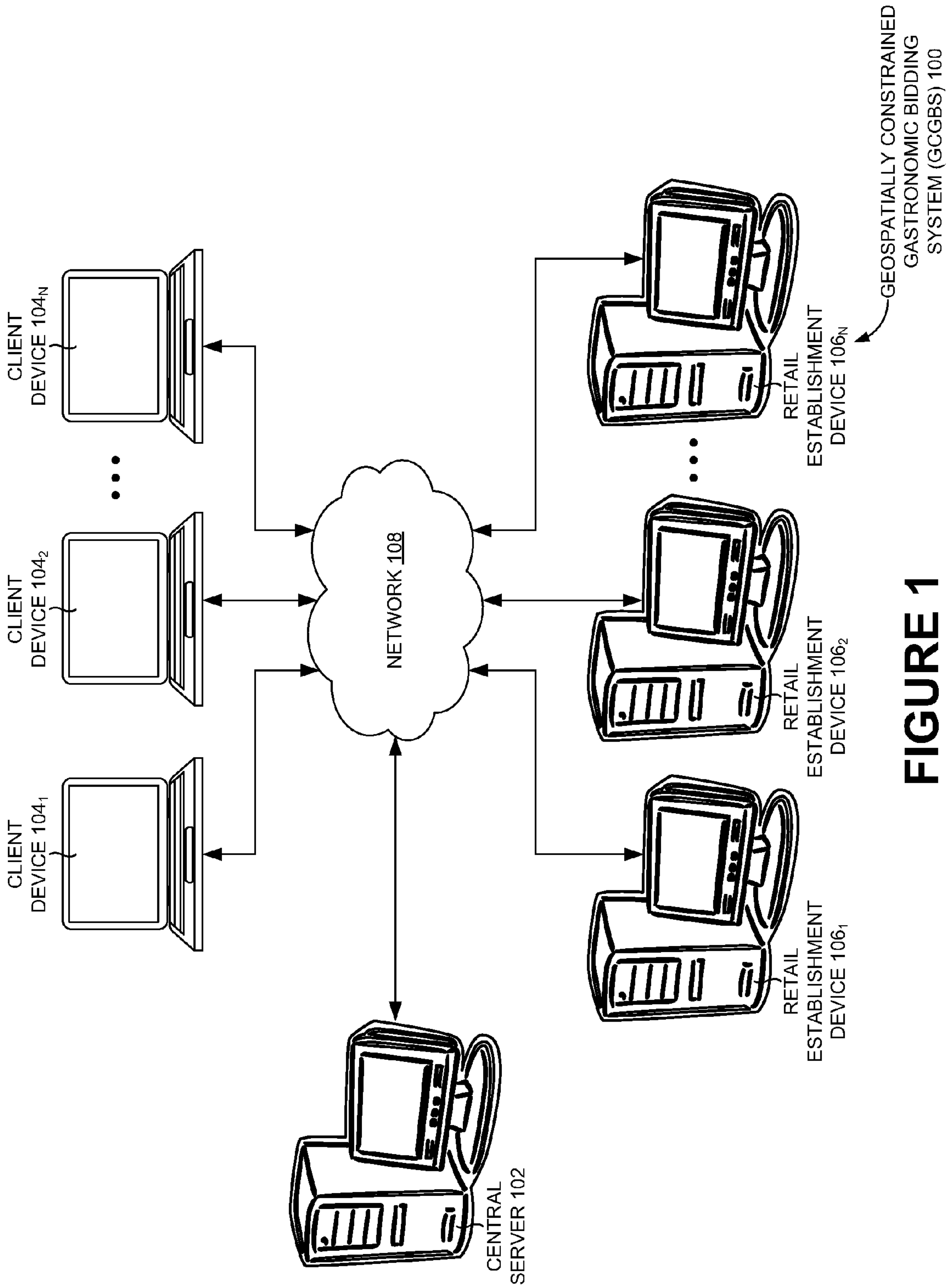
FIG. 1 is a schematic view of a geospatially constrained gastronomic bidding system (GCGBS), according to one or more embodiments.

FIG. 1 shows a geospatially constrained gastronomic bidding system (GCGBS) 100, according to one or more embodiments. In one or more embodiments, GCGBS 100 may include a central server 102 configured to have a number of gastronomical offers displayed thereon listed from one or more retail establishment(s) (e.g., restaurant(s) and/or catering service provider(s)) by way of retail establishment device(s) $\mathbf{106}_{1\text{-}N}$ associated therewith. In one or more embodiments, one or more client device(s) $\mathbf{104}_{1\text{-}N}$ may be able to bid for one or more of the number of gastronomical offers through a bidding platform associated with central server 102.

In one or more embodiments, the one or more client device(s) $\mathbf{104}_{1\text{-}N}$ may be coupled to central server 102 through computer network 108 (e.g., the Internet, Local Area Network (LAN), Wide Area Network (WAN)). In one or more embodiments, the one or more retail establishment device(s) $\mathbf{106}_{1\text{-}N}$ may also be coupled to central server 102 through computer network 108. In an alternate embodiment, retail establishment device(s) $\mathbf{106}_{1\text{-}N}$ may be coupled to central server 102 through a computer network different from the computer network coupling the one or more client device(s) $\mathbf{104}_{1\text{-}N}$ to central server 102.

Figure 2:
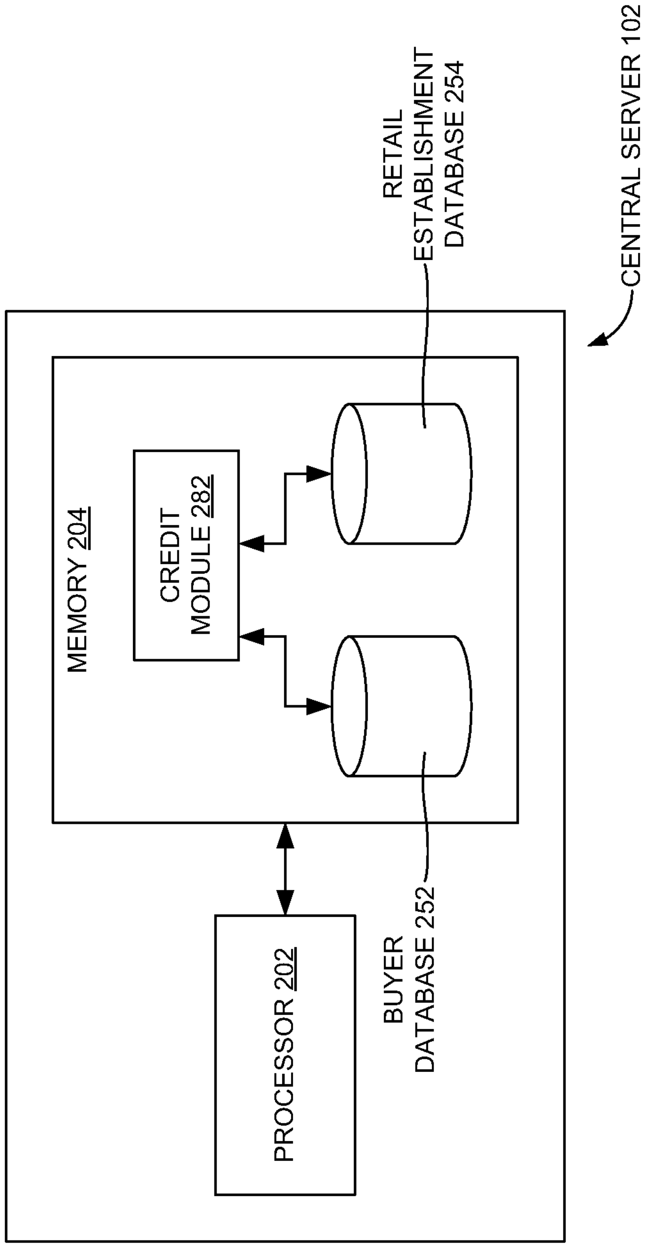
FIG. 2 is a schematic view of constituent elements of the central server of FIG. 1, according to one or more embodiments.

FIG. 2 shows constituent elements of central server 102, according to one or more embodiments. In one or more embodiments, central server 102 may include processor 202 (e.g., Central Processing Unit (CPU) and/or other optional processor(s)) configured to address storage locations associated with memory 204 (e.g., Random-Access Memory (RAM), Read-Only Memory (ROM), disk storage). In one or more embodiments, as central server 102 is associated with a bidding platform serving as an interface between a buyer (e.g., a user of a client device $\mathbf{104}_{1\text{-}N}$) and a seller (e.g., an entity associated with retail establishment device $\mathbf{106}_{1\text{-}N}$), central server 102 may be capable of transacting at a high volume.

In one or more embodiments, processor 202 may be configured to execute instructions associated with bidding processes, processing of payment(s) (e.g., credit/debit card payment(s) associated with a user of client device $\mathbf{104}_{1\text{-}N}$, verification, authentication and/or processing of the aforementioned payments through other server(s)), authentication of information from buyers (e.g., from client devices $\mathbf{104}_{1\text{-}N}$) and/or sellers (e.g., retail establishment device(s) $\mathbf{106}_{1\text{-}N}$) and geospatially constraining gastronomical search results of the prospective buyer(s) (e.g., from client devices $\mathbf{104}_{1\text{-}N}$) to retail establishment(s) (e.g., associated with retail establishment device(s) $\mathbf{106}_{1\text{-}N}$) within a residence zip code and/or a daytime zip code thereof.

For example, a user of client device $\mathbf{104}_{1\text{-}N}$ may be resident at a zip code associated with Mountain View, Calif., while spending most of the daytime hours at work at a zip code associated with Palo Alto, Calif. During registration of the user with the bidding platform provided through central server 102, the user may be required to provide the zip code associated with residency and/or the zip code associated with work. The gastronomical offers available to the user may, then, be localized to the aforementioned zip code(s). In other words, central server 102 may make gastronomical offers associated with solely the residency zip code and/or the work zip code available to the user. In another example embodiment, central server 102 may make gastronomical offers associated with all zip codes available (i.e., viewable) to the user, but may only enable transaction(s) associated with the residency zip code and/or the work zip code. In yet another example embodiment, the residency zip code and the daytime zip code associated with the user may be the same.

It is obvious that central server 102 may include a number of servers communicatively coupled to each other performing the functionality associated therewith. In one or more embodiments, memory 204 of central server 102 may include one or more database(s) associated therewith such as buyer database 252 and retail establishment database 254, where buyer database 252 includes details of user(s) associated with client devices $\mathbf{104}_{1\text{-}N}$ such as name, address including a residence location zip code and a daytime location zip code, e-mail address, credit/debit card number (if previous transaction(s) exist) and history of bidding/purchase(s) through the bidding platform, and retail establishment database 254 includes details of retail establishment(s) such as name of establishment, address/contact information including website address, payment preferences and ratings/user feedback associated therewith. The aforementioned example details of the database(s) are merely for illustrative purposes, and other implementations thereof are within the scope of the exemplary embodiments discussed herein.

Further, in one or more embodiments, memory 204 may include a credit module 282, instructions associated with which are configured to execute on processor 202. In one or more embodiments, credit module 282 may enable calculation of an amount to be credited to a service provider associated with the bidding platform provided through central server 102. Discussion associated with credit module 282 has been deferred until the end of discussion associated with FIG. 9 for the sake of clarity. It is obvious that although processor 202 and memory 204 are shown to be distinct from one another in FIG. 2, processor 202 may include memory 204 as a part thereof and vice versa.

In one or more embodiments, central server 102 may select the zip code(s) associated with a buyer to display offers from retail establishment(s) solely within the abovementioned zip code(s). In one or more embodiments, retail establishment(s) (e.g., restaurants) may enter, at central server 102, a minimum selling price (or, reserve price) associated with a gastronomical item provided therefrom through retail establishment device(s) $\mathbf{106}_{1-N}$ associated therewith. In one or more embodiments, the service provider of the bidding platform associated with central server 102 may accept the first offer above a threshold percentage (e.g., 5%) higher than the minimum reserve price (the price associated with the accepted offer may be called "accept price," for the sake of simplicity). In one or more embodiments, subsequent orders/bids may be associated with increased income for both the retail establishment and the service provider as both the minimum reserve price and the accept price may be increased for each gastronomical item associated with the retail establishment, in accordance with a business model.

In one or more embodiments, the percentage increase between the minimum reserve price and the accept price may not always be proportional due to subsidization of early bidders through the service provider. However, as discussed above, both the service provider and the retail establishment may increase income thereof with increased sale(s). FIG. 3 shows an example business model of income from bidding on a gastronomical item 302. Gastronomical item 302 (e.g., eggplant parmesan sandwich) from retail establishment 304 (e.g., ABC sandwiches) may have a retail price 350 of $8.95 associated therewith. Retail establishment 304 may offer gastronomical item 302 at a 50% discount (e.g., $4.48 approx., which is minimum reserve price 310) to users of the bidding platform associated with service provider 306.

Service provider 306 may set a maximum price constraint 308 associated with gastronomical item 302, which may at most be 80% (in general, less than or equal to a threshold) of retail price 350 of gastronomical item 302 when the first payout price (discussed below) is at most 80% of retail price 350. Maximum price constraint 308 may be equal to retail price 350 when the first payout price is within 20% of retail price 350. Thus, in the example shown in FIG. 3, maximum price constraint 308 may be set to be $7.16 (80% of $8.95). Service provider 306 may also set an accept factor 316 associated with gastronomical item 302, which is 5% in the example shown in FIG. 3. The first offer (e.g., associated with purchase of one quantity; quantity is shown under column quantity 390) for gastronomical item 302 may, therefore, be accepted from a buyer (e.g., a user at client device $\mathbf{104}_{1-N}$) at 5% above minimum reserve price 310. The monetary value associated with the first accepted offer (shown under accept price 320 in FIG. 3) may, thus, be $4.61 approx, which is 5% above the difference between minimum reserve price 310 and maximum price constraint 308.

In accordance with the first accepted offer of $4.61, service provider 306 may pay retail establishment 304 $4.48, which is equivalent to minimum reserve price 310 (here, payout price 312). Service provider 306 may set a payout factor 314 (e.g., 1%, as shown in FIG. 3; setting may be done through central server 102) associated with an increase of payout price 312 from minimum reserve price 310 to maximum price constraint 308. Thus, for the second accepted offer having a monetary value of $4.74 approx. ($4.61+5% of the difference between first accepted offer and maximum price constraint 308) associated therewith, payout price 312 may be $4.50 approx., which is $4.48+1% of the difference between maximum price constraint 308 and first payout price 312 of $4.48.

It is obvious to see that payout price 312 may be constant at $4.48 (minimum reserve price 310) when payout factor 314 is 0%. Although this yields a maximum profit to service provider 306, the business model may be static and unattractive from the perspective of retail establishment 304. Therefore, payout factor 314 may be chosen to be a finite percentage. Monetary value(s) associated with subsequent offers and payout price(s) 312 shown in FIG. 3 are obviously derived based on accept factor 316, payout factor 314, minimum reserve price 310 and maximum price constraint 308.

From FIG. 3, it is also obvious that accept price 320 may increase to maximum price constraint 308, following which accept price 320 is saturated (i.e., constant). Similarly from FIG. 3, it can be seen that payout price 312 may also increase approximately to maximum price constraint 308, following which saturation occurs. However, as accept factor 316 is higher than payout factor 314, the rate of change of the increase of accept price(s) 320 as a function of the number of gastronomical item(s) 302 sold is faster than the rate of change of the increase in the corresponding payout price(s) 312 as a function of the number of gastronomical item(s) 302 sold.

Moreover, as seen in FIG. 3, the profit (e.g., profit 370) associated with each accepted offer increases to a maximum value thereof, following which the profit decreases. It is obvious that changing values of the prices and the factors involved in the business model discussed with respect to FIG. 3 may change characteristics of the offers and the monetary values associated therewith. Further, it is obvious that although accept actor 316 is discussed as an indicator, bids above the expected accept price 320 may be accepted, thereby further increasing profit on the bid to service provider 306.

Additionally, service provider 306 may set a buy-it-now price 340 (e.g., $6.53 in FIG. 3), which is displayed to the bidding user up and until accept price 320 predicted based on accept factor 316 is less than buy-it-now price 340. The bidding user may, therefore, have the option of buying at buy-it-now price 340, which is still less than maximum price constraint 308 and retail price 350 associated with gastronomical item 302.

In one or more embodiments, accept price(s) 320 and payout price(s) 312 may be hidden from the view of the bidding user in the bidding platform displayed on client device $\mathbf{104}_{1-N}$ associated therewith, as will be discussed below. In one or more embodiments, the user may enter a bid amount with primarily retail price 350 of gastronomical item 302 serving as guidance thereto. In one or more embodiments, the user may be permitted to submit a series of standing bid amounts spread across a spectrum of time. In the scenario discussed in FIG. 3, the user may increase the bid amount until the bid amount is accepted by service provider 306 (retail establishment(s) 304 may have authorized service provider 306 to accept bid amount(s)) and/or retail establishment(s) 304. In one or more example embodiments, the standing bid amounts may be submitted (e.g., on a periodic basis) to a set of retail establishment(s) 304 based on one or more of gastronomical item 302, a business name (e.g., ABC sandwiches), a cuisine type (e.g., Italian cuisine, Indian cuisine, Chinese cuisine), a residential location zip code and a daytime location zip code. Other parameters/differentiators within the context of geospatially constrained bidding are within the scope of the exemplary embodiments.

In a first example, the user may perform a gastronomical item 302 based search on the bidding platform (or, be presented gastronomical item 302 through the bidding platform), following which he/she bids on gastronomical item 302. In a second example, the user may perform (or, be presented through the bidding platform) a geospatially constrained search by business name, following which he/she submits a bid for one or more item(s) (e.g., a combo meal). In a third example, the user may submit a bid based on the cuisine type, which is accepted by a retail establishment 304 within the residential location zip code and/or the daytime location zip code. In a fourth example, the user may submit a bid that is transmitted to a number of retail establishment(s) 304 associated with the residential location zip code and/or the daytime location zip code, following which the bid is accepted by a retail establishment 304 therein.

It is obvious that the bid(s) submitted by the user may not be accepted by any retail establishment 304 (or, service provider 306 authorized by retail establishment 304). The user may have a fixed expense in mind regarding a meal, and may be unsure of a place to eat within the residential and/or daytime location zip code. Exemplary embodiments discussed herein may provide for a means to match a meal at a retail establishment 304 with the fixed expense submitted by the user in the form of a bid to the bidding platform.

Also, it is obvious that other algorithms associated with calculation of accept price(s) 320 and/or payout price(s) 312 are within the scope of the exemplary embodiments, and that the discussion above related to the calculation thereof is merely for example illustrative purpose(s).

Figure 4:
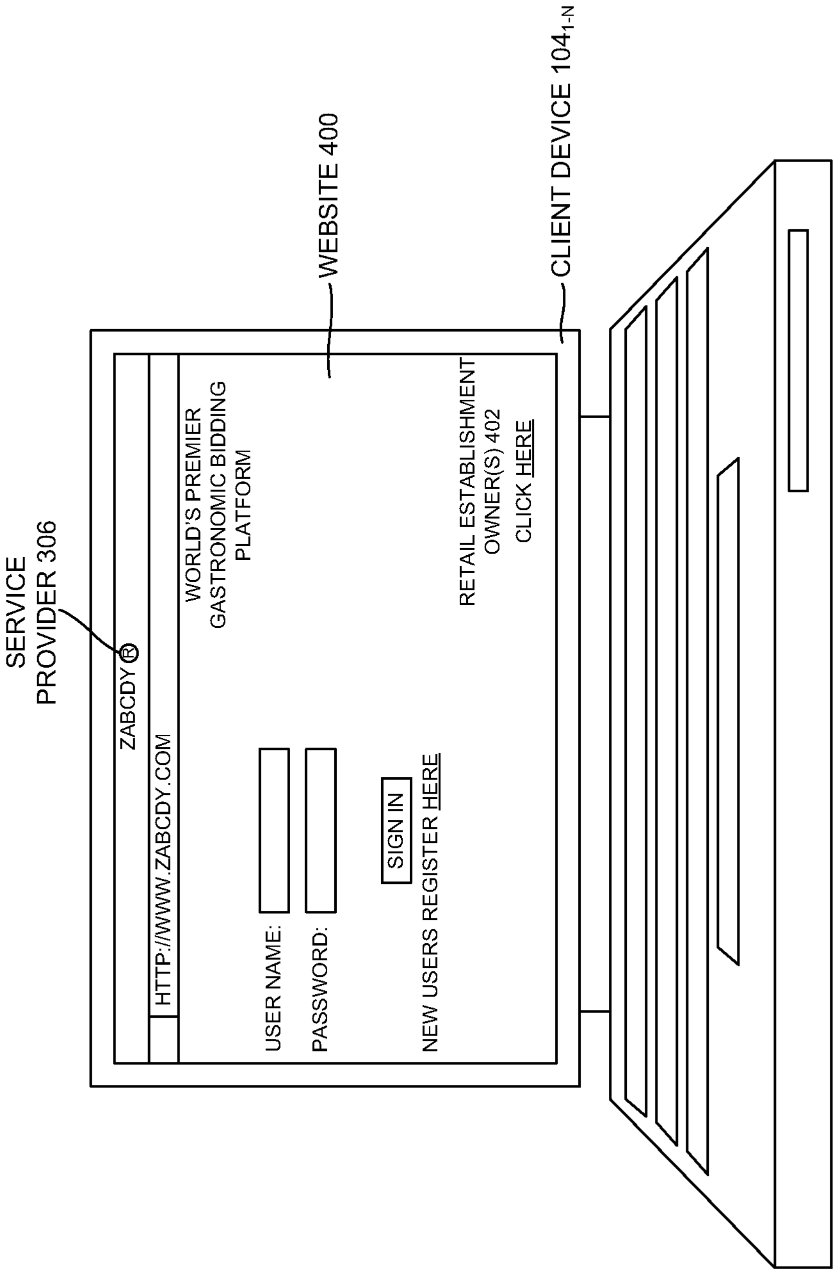
FIG. 4 is an illustrative view of a website of a gastronomic bidding service provider loaded on a browser on a client device, according to one or more embodiments.
Figure 5:
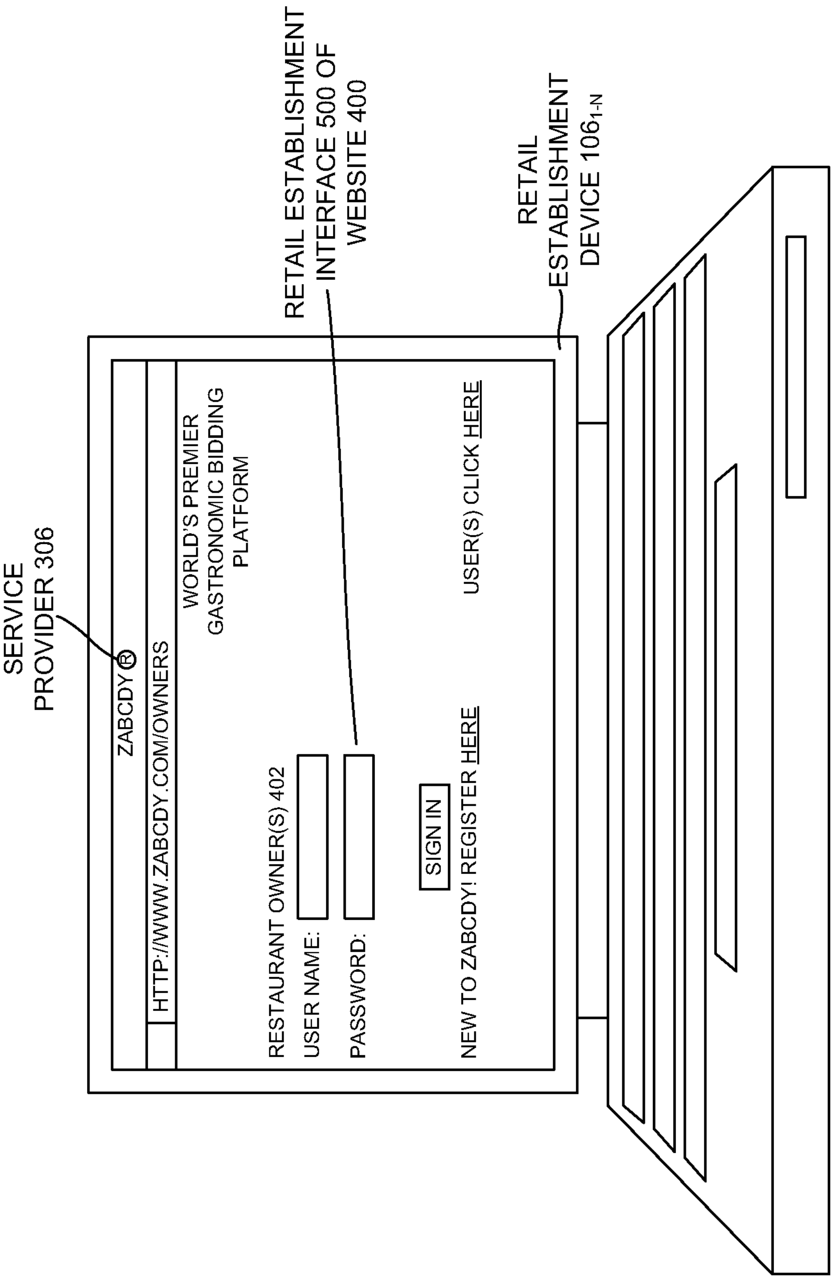
FIG. 5 is an illustrative view of a retail establishment interface of the website of the gastronomic bidding service provider of FIG. 4 accessed through a browser on a retail establishment device, according to one or more embodiments.

FIG. 4 shows a website 400 of service provider 306 associated with the bidding platform loaded on a browser on client device $104_{1-N}$ (e.g., a laptop, a personal computer (PC), a mobile phone), according to one or more embodiments. In one or more embodiments, website 400 may require a user to register therewith (e.g., name, address, residential location zip code and/or daytime location zip code) and/or to sign-in to place a bid/order thereon. Website 400 may also have a separate interface for retail establishment(s) 304, which is accessed by clicking the appropriate section thereof (e.g., retail establishment owner(s) 402). FIG. 5 shows retail establishment interface 500 of website 400 accessed through a browser on retail establishment device $106_{1-N}$, according to one or more embodiments. In one or more embodiments, retail establishment interface 500 may also require retail establishment owner(s) (or, representatives thereof) to register therewith and/or to sign-in to enter gastronomical item(s) 302 and/or specials (e.g., day-of-the-week limited special offering including one or more gastronomical item(s)).

Figure 6:
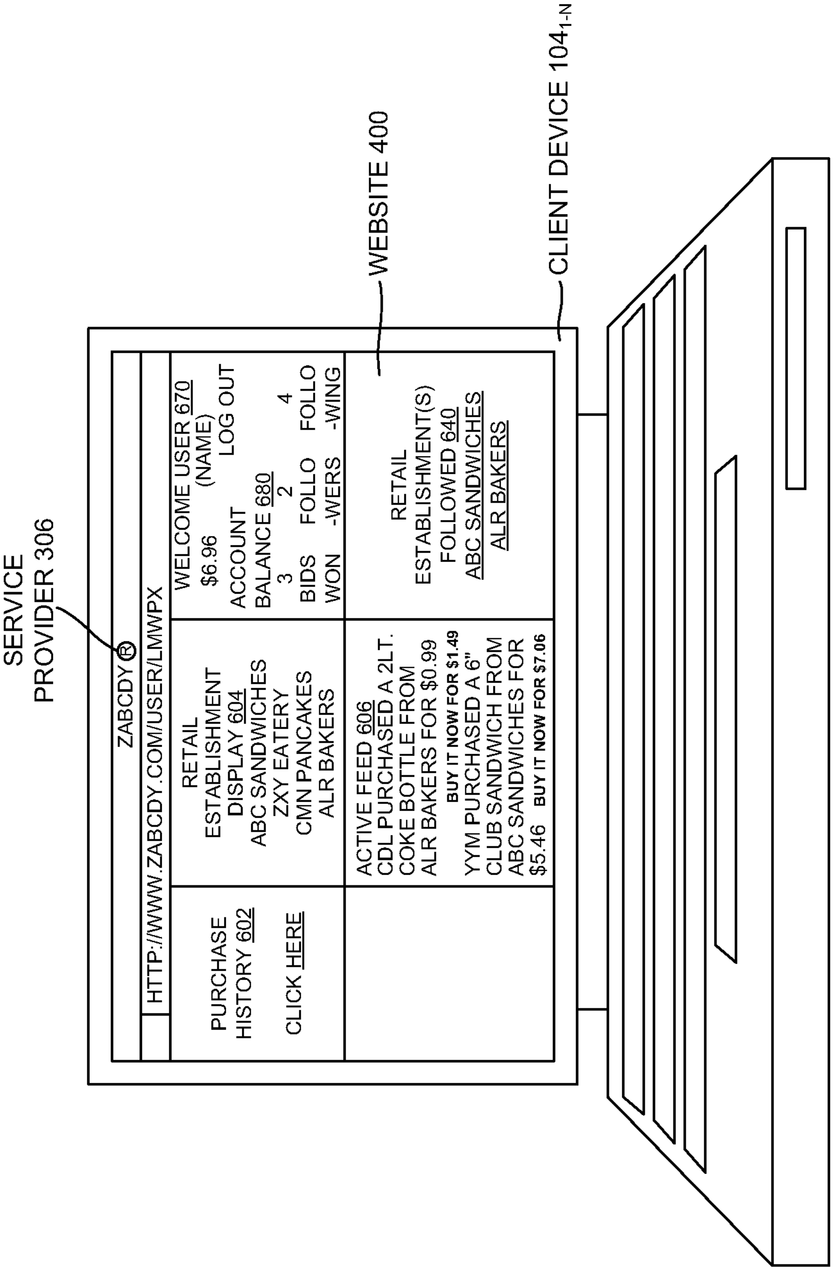
FIG. 6 is an illustrative view of the website of FIG. 4 following the log-in of a registered user thereon, according to one or more embodiments.

In one or more embodiments, website 400 may also allow user(s) and/or retail establishment owner(s)/representative(s) to log-in with social networking account(s) (e.g., Facebook account, Twitter™ account; not shown in FIGS. 4 and 5) thereof. FIG. 6 shows website 400 following the log-in of a registered user thereon, according to one or more embodiments. In one or more embodiments, website 400 may provide links to purchase history 602 and/or may display one or more retail establishment(s) 304 (e.g., through retail establishment display 604) within the residential location zip code and/or the daytime location zip code provided by the user during registration thereof with website 400. In one or more embodiments, website 400 may also provide an active feed 606 to the user based on a purchase history of user(s) associated therewith similarly constrained by the same residential location zip code and/or the daytime location zip code. In one or more embodiments, active feed 606 may enable the user to make decision(s) based on purchase(s) by other users. For example, buy-it-now price 340 associated with a gastronomic item 302 purchased by a user may be displayed to another user based on recency of activity associated therewith and similarity of constraint associated with residential location zip code and/or daytime location zip code.

In one or more embodiments, active feed 606 may be a user feed configured to publish a winning bid of a particular user to other users within the bidding platform at least one of socially (e.g., through an online community such as a forum and/or a social network-based community) and geographically associated therewith (see, e.g., FIG. 6). Additionally, in one or more embodiments, active feed 606 may be a zip feed that publishes winning bids of various retail establishment(s) 304 within the zip feed to users who reside and/or work in the residential location zip code and/or the daytime location zip code.

Further, in one or more embodiments, active feed 606 may be a retail establishment feed that publishes winning bids associated with a particular retail establishment to users socially and/or geographically associated therewith. In one or more embodiments, central server 102 may enable generation of the aforementioned feeds. In one or more embodiments, central server 102 may also permit users of the bidding platform to subscribe to the user feed, the zip feed and/or the retail establishment feed such that updates associated therewith are accessible through client device $104_{1-N}$ of each of the subscribed users.

Figure 7:
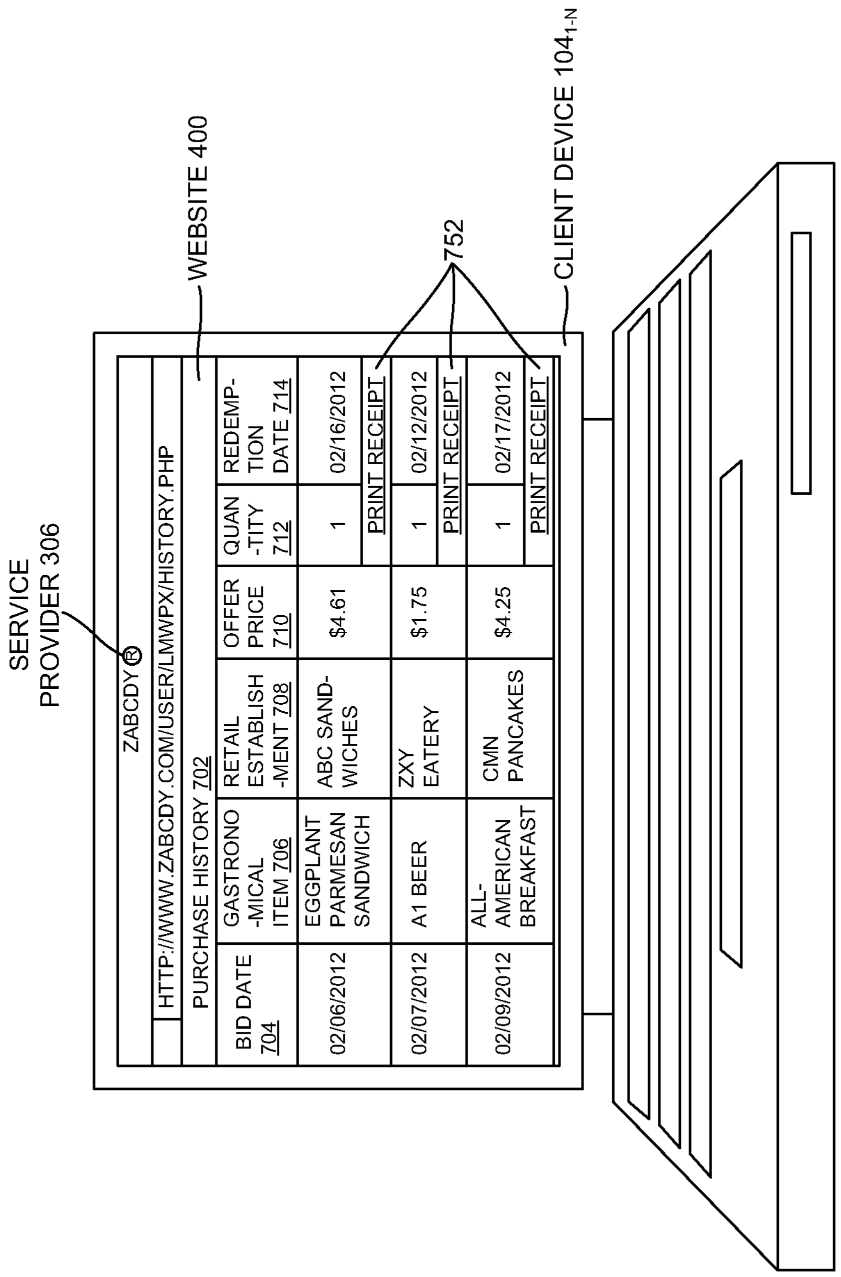
FIG. 7 is an illustrative view of purchase history of a user on the website of FIG. 4, according to one or more embodiments.

FIG. 7 shows purchase history 702 of a user on website 400, according to one or more embodiments. In one or more embodiments, the webpage associated with purchase history 702 may be reached by the logged in user upon clicking an appropriate link associated therewith. As shown in FIG. 7, purchase history 702 may include bid date 704, gastronomical item 706 (analogous to gastronomical item 302), retail establishment 708 (analogous to retail establishment 304), offer price 710, quantity 712 and redemption date 714, according to one or more embodiments. FIG. 7 shows a user having purchased three gastronomical items 706 from separate retail establishment(s) 708, with offers associated therewith to be redeemed on separate redemption dates 714.

For example, the user is shown to have the capability to redeem a $4.61 offer for an eggplant parmesan sandwich from ABC sandwiches on Feb. 16, 2012, a $1.75 offer for a bottle of A1 beer at ZXY eatery on Feb. 12, 2012 and a $4.25 offer for an All-American Breakfast at CMN pancakes on Feb. 17, 2012. It is obvious that the user may place bids on the same retail establishment 708 and/or have the same redemption date 714 associated therewith. For example, the user may bid for breakfast and dinner at the same retail establishment 708 on the same redemption date 714. Other logical variations are within the scope of the exemplary embodiments.

In one or more embodiments, retail establishment(s) 708 (e.g., restaurants) all over a region (e.g., a country like the United States of America (USA)) may self-sign up with service provider 306 to be capable of creating a menu thereof "online," creating specials (e.g., special deal(s), offer(s) on occasions such as Labor Day, Independence Day et al.) associated with gastronomical item(s) 706 and/or inviting patrons thereof. In one or more embodiments, service provider 306 may start operations associated with the bidding platform only when more than a threshold number (e.g., 5) of retail establishment(s) 708 and a threshold number (e.g., 200) number of active user(s) sign up therewith.

In accordance with an agreement (e.g., a contract) between a retail establishment 708 and service provider 306, retail establishment 708 may have to agree to permit the user(s) to receive gastronomical item(s) 706 (e.g., dine in person at the appropriate retail establishment 708) based on receipt(s) generated (e.g., see print receipt 752 of FIG. 7) through the bidding platform provided by central server 102 upon securitization of the winning bid consideration and/or a fixed fee purchase consideration of the user(s). For example, securitization of the winning bid consideration and/or a fixed fee purchase consideration of a user may be complete upon the credit/debit card thereof being charged by service provider 306.

Referring to FIG. 6 once again, in one or more embodiments, user(s) may have the capability to follow (e.g., see Retail Establishment(s) followed 640) one or more retail establishment(s) 304 of preference to aid easy cognizance of deal(s), offer(s), special(s) and/or gastronomical item(s) 302 associated therewith. Also, in one or more embodiments, user(s) may have the capability to follow one another just like a social networking environment such that a user can be apprised of eating preference(s) and/or choice(s) of one or more other user(s).

Figure 8:
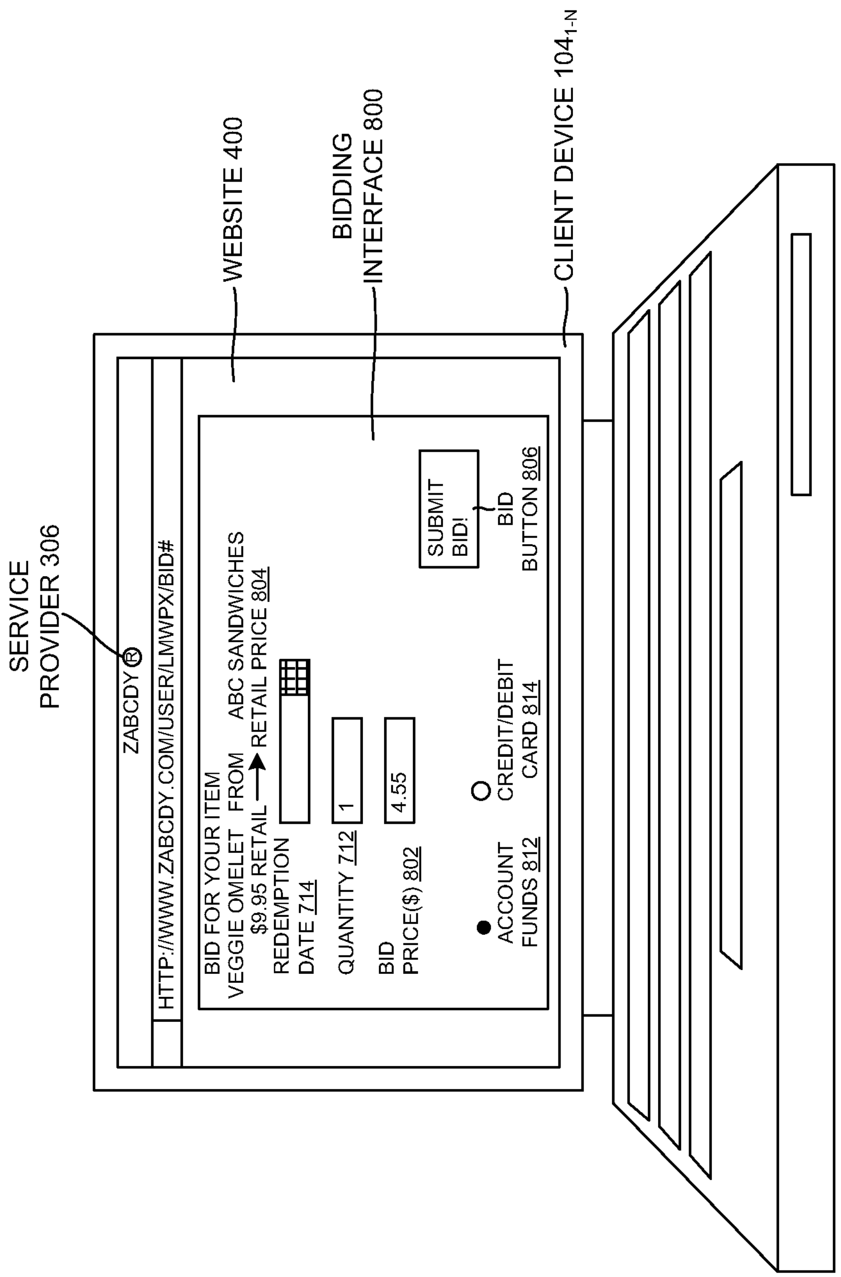
FIG. 8 is an illustrative view of a bidding interface associated with the website of FIG. 4, according to one or more embodiments.

FIG. 8 shows bidding interface 800 associated with website 400, according to one or more embodiments. In one or more embodiments, a user of client device $\mathbf{104}_{1-N}$ may be configured to arrive at bidding interface 800 upon logging into website 400 and opting to bid for a gastronomical item 706. FIG. 8 shows a user bidding for a Veggie Omlette (example of gastronomical item 706) from ABC sandwiches (example of retail establishment 708). Bidding interface 800 may require the user to choose or enter a redemption date 714, a quantity 712 of gastronomical item 706 and a bid price 802 thereof. The guideline for bidding may be provided by retail price 804 associated with gastronomical item 706 (e.g., Veggie Omelet, $9.95 retail). The user may then submit the bid through an appropriate button (e.g., bid button 806), following which central server 102 is configured to determine whether to accept/reject the bid.

For example, a bid price below the expected payout price 312 may be instantly rejected and a bid corresponding to a sum of the expected payout price 312 and a price associated with accept factor 316 may be accepted at or above the aforementioned sum. Also, FIG. 8 shows user payment of service provider 306 through account funds 812 and credit/debit card 814 as options. Account funds 812 may be an amount the user has as credit to his/her account on website 400. For example, the user may transfer funds to his/her account through a bank transfer, a service provider transfer (e.g., through Paypal®), or, the amount may be available to the user as credit amount toward a refund from one or more retail establishment(s) 708 and/or service provider 306. FIG. 6 shows a user 670 associated with website 400 as having a $6.96 as account balance 680 for illustrative purpose.

In one example embodiment, service provider 306 may credit the user account (e.g., a $20 credit) for signing up therewith as a promotional offer to attract more user(s) thereto (e.g., by way of the user spreading word through the Internet, word of mouth etc.). In one or more embodiments, the user may possess the capability to "follow" location(s) (e.g., cities), cuisine style(s), gastronomical item(s) 706, retail establishment(s) 708 or other users through website 400 to be apprised of social behavior, choice(s) and/or available options.

In one or more embodiments, a user, upon winning a bid, may have the result(s) thereof posted to his/her social networking page (e.g., a Facebook wall) through service provider 306. This may be made possible through either through the user logging into website 400 using his/her social networking profile and/or the user permitting service provider 306 to access his/her social networking profile. The social networking profile of the user may be stored in buyer database 252 of FIG. 2, for example, thereby enabling a social networking page associated therewith to be populated with his/her bidding result(s). The user may obviously opt not to have the social networking page populated with the bidding result(s).

Figure 9:
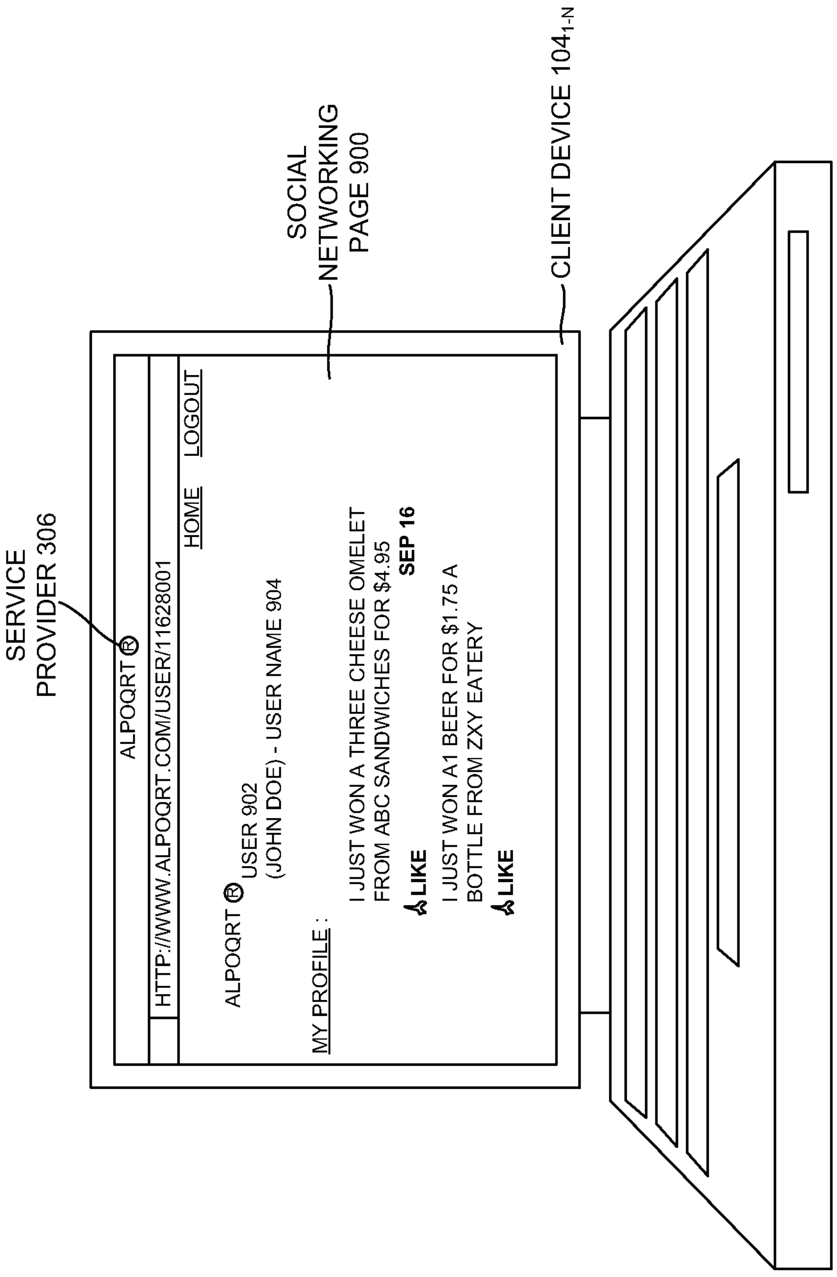
FIG. 9 is an illustrative view of a social networking page of a user associated with a gastronomic bidding service provider being populated with bid result(s), according to one or more embodiments.

FIG. 9 shows an example social networking page 900 of a user 902 associated with service provider 306 being populated with bid result(s), according to one or more embodiments. In the example embodiment of FIG. 9, the bid result(s) are shown as "I just won a three cheese omelet from ABC sandwiches for $4.95," and "I just won A1 beer for $1.75 a bottle from ZXY eatery," followed by the appropriate URLs associated with the aforementioned retail establishment(s) 708, under the name of user 902 (e.g., username 904 shown as John Doe). The aforementioned is merely for example purposes, and other forms of populating social networking pages are within the scope of the exemplary embodiments. In one or more embodiments, the aforementioned population of social networking page 900 may enable friend(s) of user 902, friend(s) of friend(s) of user 902 and/or networking group members thereof to track and/or view offers availed by user 902.

Referring to FIG. 2 once again, in one or more embodiments, central server 102 may include credit module 282 resident on memory 204 configured to enable execution of instructions associated with crediting service provider 306 on processor 202 for a successful accepted offer. For example, credit module 282 may enable crediting an account (e.g., a credit/debit card, a bank account) associated with service provider 306 with an amount between the offer price (e.g., expected accept price 320 and above) and payout price 312 associated with a gastronomical item 302. In one or more embodiments, credit module 282 (or, a related module on memory 204 configured to execute on processor 202) may also be associated with crediting an account associated with the appropriate retail establishment 304 with payout price 312 for the gastronomical item 302 following the successful completion of the debit process (or, payment for the offer) associated with the user (or, buyer of gastronomical item 302).

In one or more embodiments, a retail establishment 304 may also provide home delivery (or, work delivery) options to the user if the user is within a threshold distance (e.g., <4 miles) of a location of retail establishment 304. In such scenarios, in one or more embodiments, service provider 306 (e.g., with the authorization of retail establishment 304, or, through implementing a policy associated with website 400) may append a delivery charge to a winning bid consideration and/or a fixed fee (e.g., a buy-it-now price 340) purchase consideration associated with the user based on the physical address provided by the user (or, stored in buyer database 252). The user may be required to pay for the delivery if requesting a home delivery (or, a work delivery), or, may have the option to dispense with the delivery charge by not opting for the home delivery (or, work delivery).

In an example embodiment, the user may also get at least a portion of the delivery charge(s) waived if his/her order exceeds a threshold monetary value (e.g., $100). In another example embodiment, taxes (e.g., state food taxes) may be claimed from the user during processing of a payment therefrom. Alternately, the user may opt to pay for the taxes following consumption of gastronomical item 302. In yet another example, the user may be provided, through website 400, the option to merely pay for a portion of the monetary value associated with gastronomical item 302. The user may then pay the balance amount following the consumption of gastronomical item 302 at the location of retail establishment 304 and/or following the receipt of the home delivery order (or, work delivery order).

In one or more embodiments, as discussed above, the fixed fee option (e.g., buy-it-now price 340) may be hidden from the view of the user on the bidding platform provided through central server 102 if accept price 320 associated with gastronomical item 302 exceeds the fixed fee. In one or more embodiments, a message associated with a percentage saved on a successful bid of gastronomical item 302 and/or a fixed fee purchase (e.g., at buy-it-now price 340) thereof may be posted (not shown) in active feed 606 and/or the social networking page associated with the user. In one or more embodiments, the "percentage saved" may be calculated based on accept price 320 and retail price 350 of gastronomical item 302.

Figure 10:
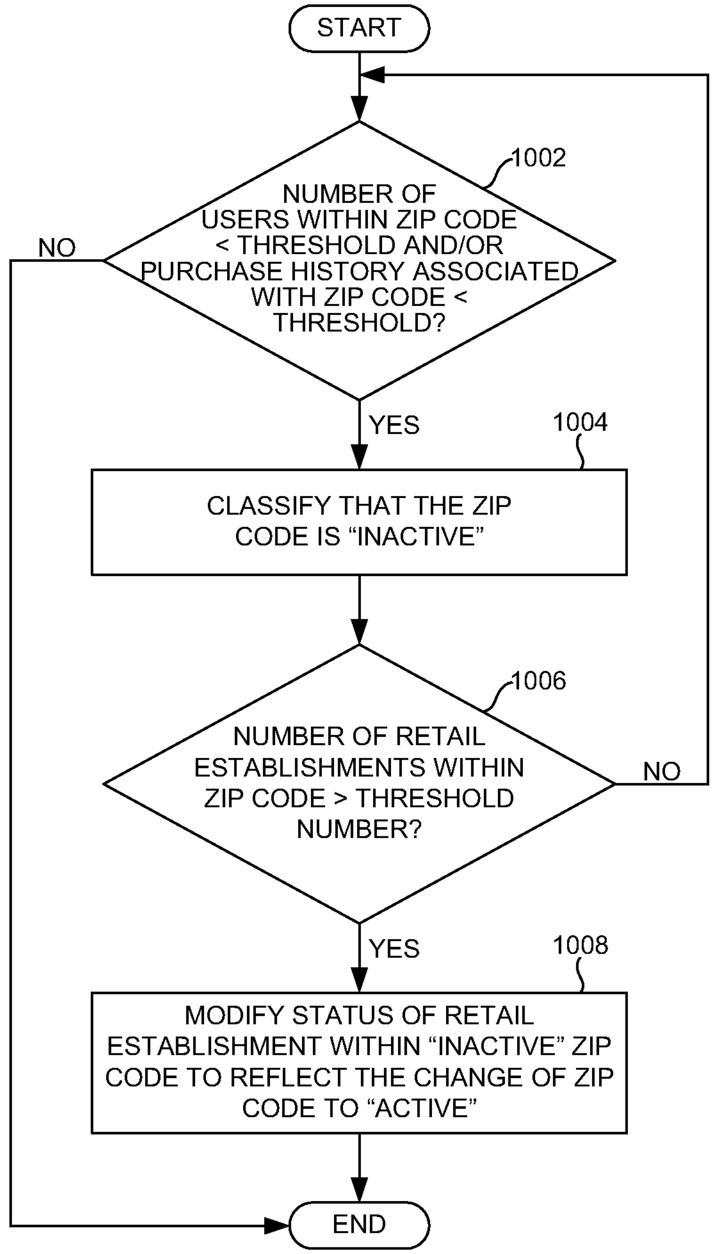
FIG. 10 is a flowchart detailing the operations involved in a method of qualifying a retail establishment in an "inactive" zip code as a retail establishment in an "active" zip code through the central server of FIG. 1, according to one or more embodiments.

In one or more embodiments, one or more retail establishment(s) 304 in an "inactive" zip code (e.g., zero, or, a low number of patrons associated therewith) listing gastronomical item(s) 302 to be marketed through the bidding platform provided by service provider 306 may qualify as retail establishment(s) 304 within an active zip code, provided the number of retail establishment(s) 304 within the "inactive" zip code is above a threshold number (e.g., 5). Gastronomical items 302 associated with the aforementioned one or more retail establishment(s) 304 may be marketed to users associated with a region around the previously "inactive" zip code (now "active" zip code). FIG. 10 shows a flowchart detailing the operations involved in a method of qualifying a retail establishment 304 in an "inactive" zip code as a retail establishment 304 in an "active" zip code through central server 102 associated with service provider 306, according to one or more embodiments.

In one or more embodiments, operation 1002 may involve verifying, through central server 102, as to whether a number of users in a zip code is below a threshold value (e.g., 200) and/or a purchase history associated with the zip code is below a threshold monetary value/quantity of orders. In one or more embodiments, if yes, operation 1004 may involve classifying, through central server 102, that the zip code is "inactive." In one or more embodiments, operation 1006 may involve checking as to whether retail establishment(s) 304 in the "inactive" zip code is above a threshold number. In one or more embodiments, if the number of retail establishment(s) has increased above the threshold number, operation 1008 may involve modifying, through central server 102, a status of retail establishment 304 within the "inactive" zip code to reflect the change of the zip code to "active." One or more module(s) executing on processor 202 (or, stored in memory 204) may be configured to perform action(s) associated with the abovementioned qualification.

In one or more embodiments, service provider 306 may also be configured to purchase a set of gastronomical item(s) 302 from a preferred retail establishment 304 at a wholesale price (e.g., at 50% discount). Then, in one or more embodiments, service provider 306 may then market the aforementioned set of gastronomical item(s) 302 through the bidding platform associated therewith to the users thereof. Here, in one or more embodiments, not only does service provider 306 increase exposure thereof, but also service provider 306 provides means to increase exposure of the preferred retail establishment 304. Now, in one or more embodiments, service provider 306 may not be required to credit the preferred retail establishment 304 for the bids and/or the fixed fee purchases.

Figure 11:
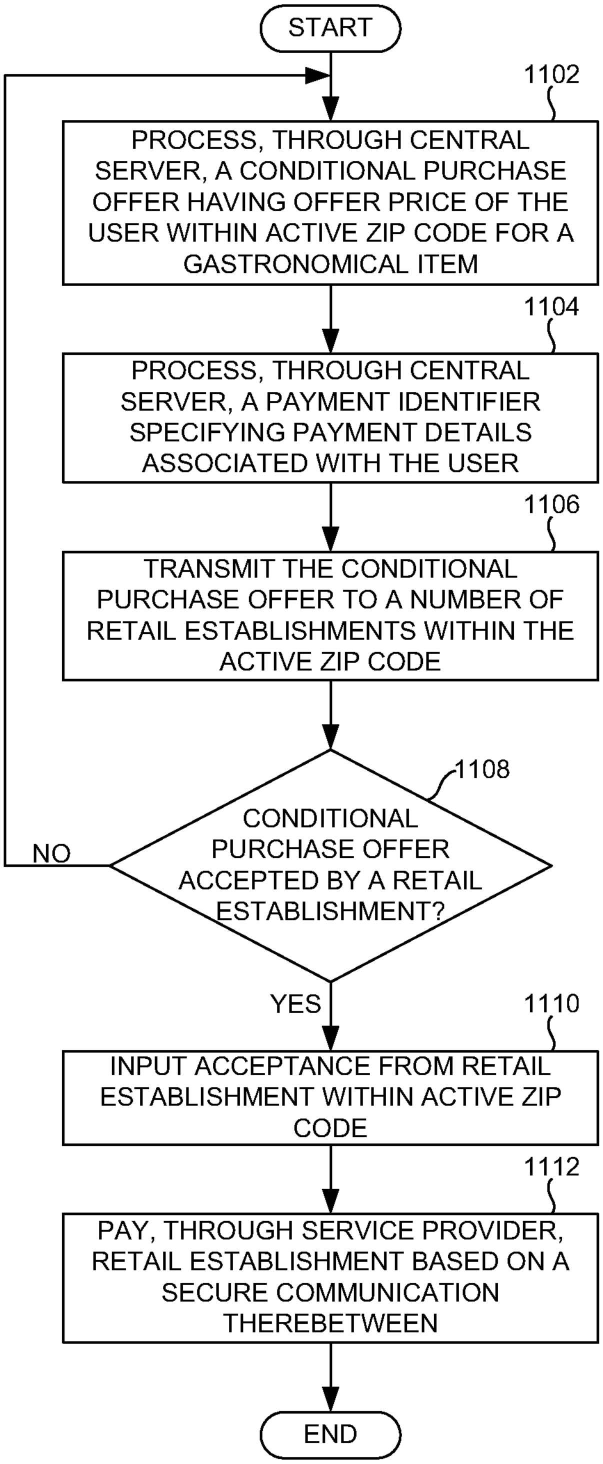
FIG. 11 is a flowchart detailing the operations involved in a method of transacting a conditional purchase offer to be paid for by a user between a gastronomic bidding service provider and a retail establishment, according to one or more embodiments.

FIG. 11 shows a flowchart detailing the operations involved in a method of transacting a conditional purchase offer to be paid for by a user (e.g., associated with client device $104_{1-N}$) between service provider 306 and retail establishment 304, according to one or more embodiments. In one or more embodiments, the conditional purchase offer may only be available to users within an active specific zip code. Here, the user may be configured to input a desired price thereof (or, offer price) through the bidding platform provided through service provider 306 to be matched with conditional offer(s) within the active zip code. In one or more embodiments, operation 1102 may involve processing, through central server 102, a conditional purchase offer having the offer price of the user within the active zip code for a gastronomical item associated with one or more retail establishment(s) 304.

In one or more embodiments, operation 1104 may involve processing, through central server 102, a payment identifier specifying payment details associated with the user (e.g., credit card/debit card details). In one or more embodiments, the payment identifier may be associated with the conditional purchase offer. In one or more embodiments, operation 1106 may involve transmitting the conditional purchase offer to a number of retail establishment(s) 304 within the active zip code following the processing of the payment identifier. In one or more embodiments, operation 1108 may involve verifying as to whether the conditional purchase offer is accepted by a retail establishment 304 within the active zip code.

In one or more embodiments, if yes, operation 1110 may involve inputting, into central server 102, the acceptance from retail establishment 304 within the active zip code. In one or more embodiments, the acceptance is responsive to the conditional purchase offer by the user within the geospatial constraint of the active zip code. In one or more embodiments, operation 1112 may then involve service provider 306 paying retail establishment 304 (e.g., monetary value of payout price 312) based on a secure communication between retail establishment device $106_{1-N}$ associated with retail establishment 304 and central server 102 associated with service provider 306.

Now, in one or more embodiments, more than one retail establishment 304 may accept the conditional purchase offer by the user. Here, in one or more embodiments, acceptances from each retail establishment 304 (e.g., through retail establishment device $106_{1-N}$ associated therewith) may be input into central server 102. Again, in one or more embodiments, each acceptance may be responsive to the conditional purchase offer. In one or more embodiments, one of the received acceptance(s) may be selected through central server 102 (e.g., through processor 202) to determine a selected retail establishment 304 from the number of retail establishments 304 accepting the conditional purchase offer. Again, in one or more embodiments, payment to the selected retail establishment 304 may be as discussed above.

Figure 12:
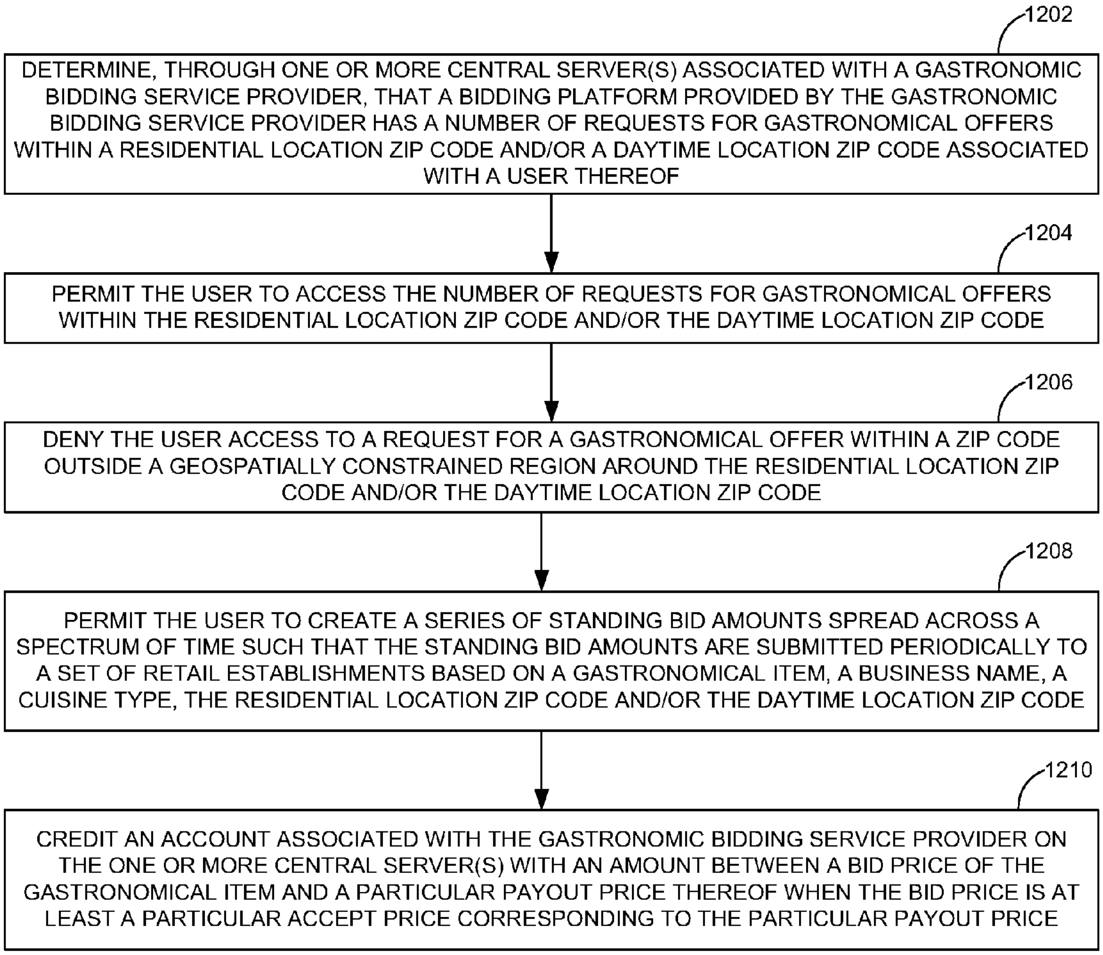
FIG. 12 is a process flow diagram detailing the operations involved in a method of realizing geospatially constrained bidding of a gastronomical item, according to one or more embodiments.

It is obvious that one or more processes associated with service provider 306 may be performed through processor 202 of central server 102. FIG. 12 shows a process flow diagram detailing the operations involved in a method of realizing geospatially constrained bidding of a gastronomical item (e.g., gastronomical item 302), according to one or more embodiments. In one or more embodiments, operation 1202 may involve determining, through one or more central server(s) (e.g., central server 102) associated with a gastronomic bidding service provider (e.g., service provider 306), that a bidding platform provided by the gastronomic bidding service provider has a number of requests for gastronomical offers within a residential location zip code and/or a daytime location zip code associated with a user thereof. In one or more embodiments, the one or more central server(s) includes processor 202 communicatively coupled to memory 204.

In one or more embodiments, operation 1204 may involve permitting the user to access the number of requests for gastronomical offers within the residential location zip code and/or the daytime location zip code thereof. In one or more embodiments, operation 1206 may then involve denying the user access to a request for a gastronomical offer within a zip code outside a geospatially constrained region around the residential location zip code and/or the daytime location zip code thereof. In one or more embodiments, operation 1208 may involve permitting the user to create a series of standing bid amounts spread across a spectrum of time such that the standing bid amounts are submitted periodically to a set of retail establishments 106$_{1-N}$ based on at least one of a gastronomical item, a business name, a cuisine type, the residential location zip code and the daytime location zip code. In one or more embodiments, the standing bid amounts may be associated with one or more request(s) for gastronomical offers.

In one or more embodiments, operation 1210 may then involve crediting an account associated with the gastronomic bidding service provider on the one or more central server(s) (e.g., central server 102) with an amount between a bid price of the gastronomical item and a particular payout price thereof when the bid price is at least a particular accept price corresponding to the particular payout price.

Figure 13:
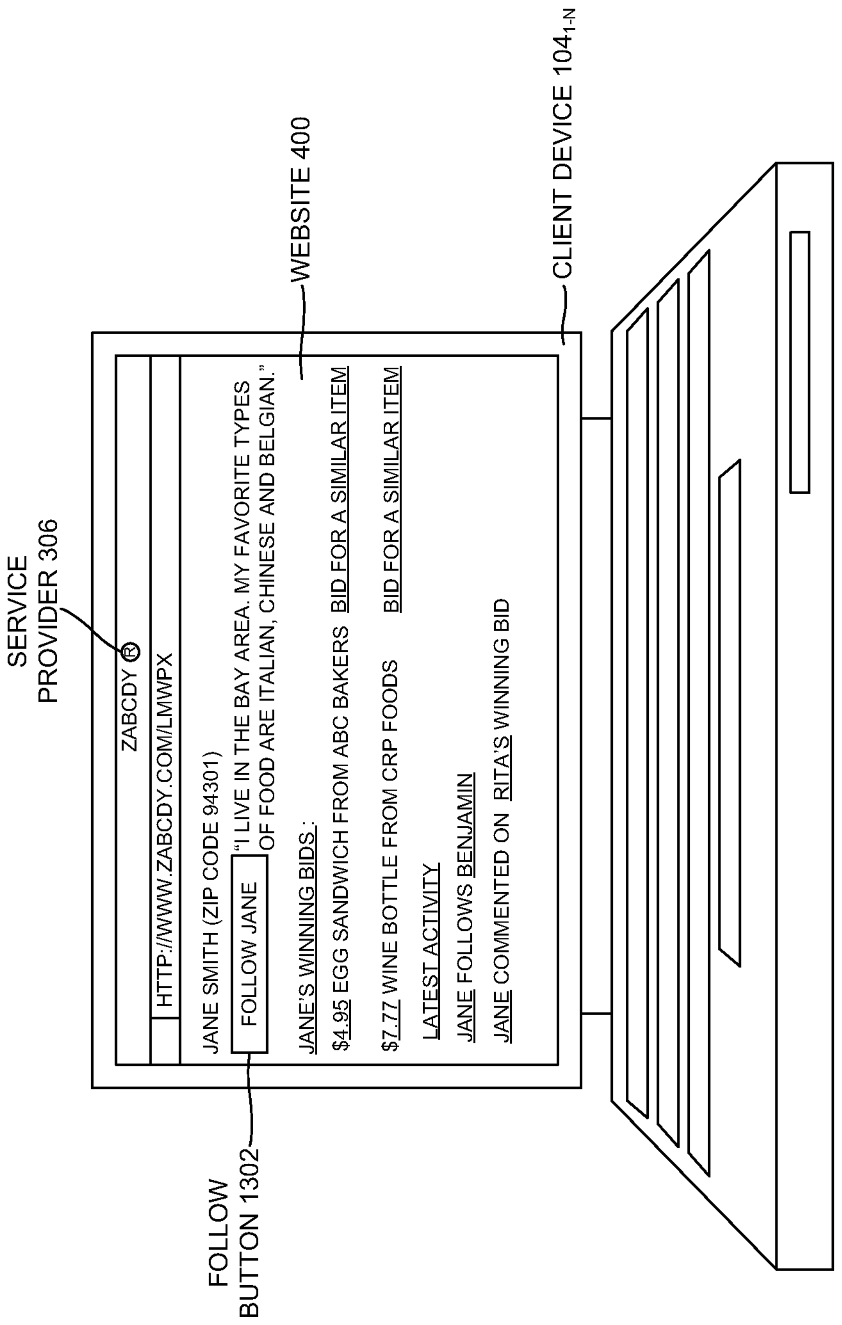
FIG. 13 shows an example user profile associated with the GCGBS of FIG. 1.

FIG. 13 shows an example user profile associated with the bidding platform provided through service provider 306. Specifically, FIG. 13 shows an example user profile of Jane Smith associated with the 94301 zip code at website 400. The example user profile may be accessed through client device 104$_{1-N}$ by clicking on an appropriate link associated therewith. The user profile may include a compiled list of winning bids and/or recent activity associated therewith, as shown in FIG. 13. Other list(s) such as a list of comment(s) (not shown) of the user may also be compiled at the profile page associated with the user.

FIG. 13 also shows the user profile as providing a capability to other users to “follow” the user (see Follow Button 1302). “Following” a user may enable other users to be apprised of activity, updates, form posts, discussions, winning bids, purchases etc. associated therewith. Thus, the bidding platform may provide “online” networking capabilities to subscribed users thereof.

Figure 14:
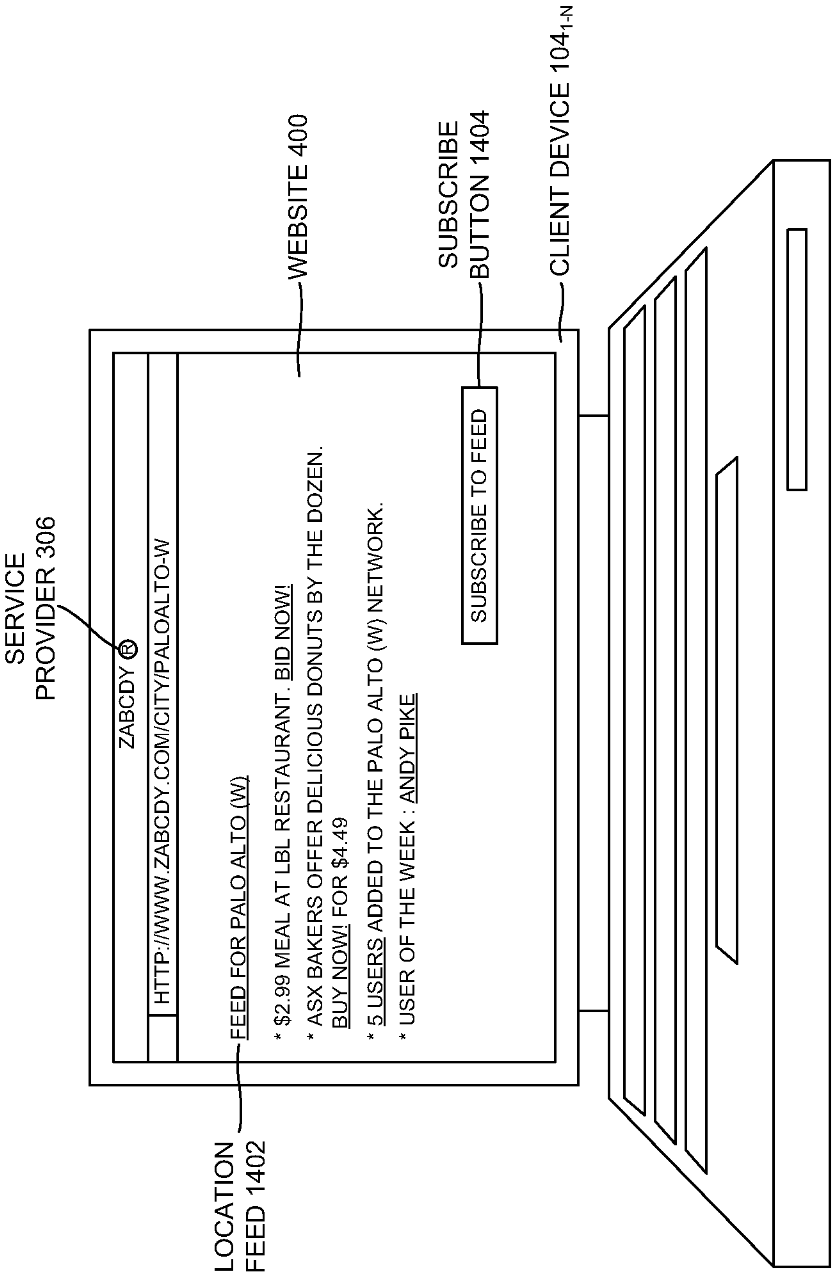
FIG. 14 shows an example location feed provided through the central server of the GCGBS of FIG. 1.

FIG. 14 shows location feed 1402 being provided the bidding platform (accessed through client device 104$_{1-N}$) associated with service provider 306. Location feed 1402 may be analogous to the zip feed discussed with regard to FIG. 6 above. Location feed 1402 for a zip code associated with a user may be accessed, for example, by the user logging into website 400. Alternately, users of client devices 104$_{1-N}$ may obtain location feed 1402 for a specific zip code by choosing the zip code on website 400 with/without logging into website 400. The user(s) may also be provided a capability to subscribe to location feed 1402 (e.g., through subscribe button 1404) by logging into website 400. The aforementioned user(s) may or may not be associated with the zip code related to location feed 1402. In one or more embodiments, a user may directly be subscribed to location feed 1402 based on the zip code(s) associated therewith. Other implementations are within the scope of the exemplary embodiments. Generation of and/or subscription to location feed 1402 (and other examples of active feed 606) may be enabled through central server 102.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer device). Accordingly, the specification and drawings are to be regarded in an illustrative rather than a restrictive sense.

What is claimed is:

1. A method comprising:

determining, through at least one central server, which includes a processor communicatively coupled to a memory and which is associated with a gastronomic bidding service provider, that a bidding platform provided by the gastronomic bidding service provider has a number of requests for gastronomical offers within at least one of a residential location zip code and a daytime location zip code associated with a user thereof;

permitting the user to access the number of requests for gastronomical offers within the at least one of the residential location zip code and the daytime location zip code thereof;

denying the user access to a request for a gastronomical offer within a zip code outside a geospatially constrained region around the at least one of the residential location zip code and the daytime location zip code thereof;

permitting the user to create a series of standing bid amounts spread across a spectrum of time such that the standing bid amounts are submitted periodically to a set of retail establishments based on at least one of a gastronomical item, a business name, a cuisine type, the residential location zip code and the daytime location zip code, the standing bid amounts being associated with at least one request for gastronomical offers; and crediting an account associated with the gastronomic bidding service provider on the at least one central server with an amount between a bid price of the gastronomical item and a particular payout price thereof when the bid price is at least a particular accept price corresponding to the particular payout price.

2. The method of claim 1, further comprising at least one of:

permitting a retail establishment within the at least one of the residential location zip code and the daytime location zip code of the user to create a minimum reserve price of a gastronomical item associated therewith based on a discount percentage automatically applied to a retail price thereof, the minimum reserve price also being a first payout price of the gastronomical item;

permitting the retail establishment to create a limited special offering comprising at least one of the gastronomical item and other gastronomical items associated therewith;

increasing subsequent payout prices of the gastronomical item from the first payout price up to a constrained price associated therewith, the constrained price being one of below and equal to a threshold percentage of the retail price of the gastronomical item when the first payout price is at most the threshold percentage of the retail price, and the constrained price being equal to the retail price of the gastronomical item when the first payout price is within another threshold percentage value equal to a difference between 100 and the threshold percentage value;

increasing accept prices corresponding to the payout prices of the gastronomical item such that a rate of change of the accept prices as a function of a number of times the gastronomical item is sold is faster than a rate of change of the payout prices as the function of the number of times the gastronomical item is sold;

hiding each accept price and payout price from a view of the user of the bidding platform at a client device associated therewith such that the user is configured to bid for the gastronomical item with primarily the retail price of the gastronomical item as a guidance thereto; and hiding a fixed fee request for an offer in the bidding platform presented to the user through the at least one central server when the particular accept price is above the fixed fee request for the offer.

3. The method of claim 2, further comprising at least one of:

generating a user feed that publishes a winning bid of a particular user to other users within the bidding platform at least one of socially and geographically associated therewith;

generating a zip feed that publishes winning bids of various retail establishments within the zip feed to users who at least one of reside and work in the at least one of the residential location zip code and the daytime location zip code;

generating a retail establishment feed that publishes winning bids of a particular retail establishment to users at least one of socially and geographically associated therewith; and permitting users of the bidding platform to subscribe to at least one of the user feed, the zip feed and the retail establishment feed such that updates associated therewith are accessible through a client device of each of the subscribed users.

4. The method of claim 2, further comprising at least one of:

qualifying each of at least a threshold number of retail establishments in accordance with an agreement between the at least the threshold number of retail establishments and the gastronomic bidding service provider in which the at least the threshold number of retail establishments agree to permit the user and other users to receive corresponding gastronomical items thereof based on receipts generated through the at least one central server upon securitization of at least one of a winning bid consideration and a fixed fee purchase consideration of the user and the other users;

appending a delivery charge to the at least one of the winning bid consideration and the fixed fee purchase consideration when the user provides a physical address that is within a threshold distance from a location address of the retail establishment;

automatically publishing a message associated with a saving associated with the at least one of the winning bid consideration and the fixed fee purchase consideration of the user to a social networking page associated with the user following completion of the securitization thereof;

qualifying another retail establishment in an inactive location zip code when the another retail establishment lists gastronomical items to be marketed to users in a region around the inactive location zip code through the bidding platform; and transforming the inactive location zip code to an active location zip code when there are at least a threshold number of retail establishments qualifying in the inactive location zip code.

5. The method of claim 1, further comprising:

pre-purchasing, through the at least one central server, a set of gastronomical items from a preferred retail establishment; and marketing, to a plurality of users, the set of gastronomical items through the bidding platform provided by the gastronomic bidding service provider.

6. The method of claim 1, further comprising:

processing, through the at least one central server, a conditional purchase offer having an offer price of the user within the at least one of the residential location zip code and the daytime location zip code for a gastronomical item associated with a plurality of retail establishments therein;

processing, through the at least one central server, a payment identifier specifying payment information of the user, the payment identifier being associated with the conditional purchase offer;

transmitting the conditional purchase offer to the plurality of retail establishments within the at least one of the residential location zip code and the daytime location zip code;

receiving, at the at least one central server, an acceptance from a retail establishment within the at least one of the residential location zip code and the daytime location zip code, the acceptance being responsive to the conditional purchase offer by the user therein;

paying the retail establishment associated with the acceptance based on the payment identifier; and selecting, when a plurality of retail establishments transmits acceptances to the at least one central server, one received acceptance therefrom to determine a selected retail establishment.

* * * * *